United States Patent Office 2,983,670
Patented May 9, 1961

2,983,670

HYDROCRACKING PROCESS AND CATALYST

Frank H. Seubold, Jr., Claremont, Calif., assignor to Union Oil Company of California, Los Angeles, Calif., a corporation of California No Drawing. Filed June 2, 1958, Ser. No. 739,000

16 Claims. (Cl. 208—110)

This invention relates to methods for the catalytic hydrocracking of high-boiling mineral oil fractions to produce lower boiling fractions such as gasoline, and to certain novel catalysts for effecting such hydrocracking. More particularly, the catalysts employed herein comprise as their essential active component certain partially dehydrated metallo-alumino-silicates of the zeolite type. It has been found that such zeolites, when carefully prepared and dehydrated in such manner as to produce a high-silica crystal form of the so-called "X" type, wherein the pore diameter within the crystals is relatively uniform within the range of about 11 to 14 A., exhibit a substantial and significant hydrocracking activity. It has further been found that this hydrocracking activity may be promoted by the addition of conventional hydrogenating components, e.g. transitional metals, their oxides or sulfides. Although the activity level of the catalysts of this invention is somewhat lower than that of other known hydrocracking catalysts, the catalysts of this invention are especially advantageous in that they appear to induce very little coke formation, and hence are quite selective and will maintain their activity for long periods of time.

The hydrocracking process itself consists in passing the feedstock in admixture with hydrogen over the catalyst at suitable temperatures, feed rates, pressures, etc. to effect a substantial conversion of the feedstock to lower boiling materials, e.g. gasoline. Simultaneously, any organic sulfur and nitrogen components present in the feed are largely decomposed to hydrogen sulfide, ammonia and hydrocarbon fragments. Such hydrocracking processes are often referred to as destructive hydrogenation, hydrogenolysis, or in causes where the feed is essentially an alkaryl hydrocarbon, the process is often termed hydrodealkylation.

It is a principal object of this invention to provide efficient and selective catalysts for the hydrocracking of mineral oils, which will effect a maximum conversion of the feed to mid-boiling-range hydrocarbons, and a minimum of destructive degradation to products such as methane and coke. Another object is to provide catalysts which will maintain their activity for long periods on stream, without requiring regeneration. A specific object is to provide catalysts of inherently low coke-forming tendencies, whereby the hydrocracking process may be conducted under relatively low hydrogen pressures, thereby minimizing utility costs and plant construction costs, and also minimizing the danger of explosive runaway reactions. A specific object is to provide catalysts which are effective for the hydrocracking of refractory stocks such as cycle oils from conventional catalytic or thermal cracking operations, whereby additional conversion to gasoline may be obtained. Another specific object is to provide catalysts which display a minimum tendency to effect hydrogenation of aromatic rings, whereby high quality gasoline fractions of high antiknock quality may be produced therefrom. Another object is to provide catalysts which are especially active for dealkylation, i.e. for effecting scission of side chains from alkyl aromatics. Other objects and advantages will be apparent from the description which follows.

Hydrocracking processes as known in the art suffer from several serious disadvantages. In general, such processes are carried out at high temperatures in excess of 900° F. These temperatures tend to favor dehydrogenation, and hence to obtain any substantial hydrogenating effect from the added hydrogen it is necessary to employ relatively high pressures of e.g. 1,000 to 8,000 p.s.i.g. These high hydrogen pressures are also necessary in order to maintain the catalyst in sufficiently coke-free form that a practical catalyst life may be obtained. In other words, the hydrogen and the coke on the catalyst will reach an equilibrium, and low hydrogen pressures favor the rapid buildup of coke, the formation of which is inherent in such high temperature processes.

It is almost universal practice in hydrocracking processes to add to the catalyst a transitional metal hydrogenating component. This hydrogenating component is frequently required mainly for the purpose of promoting the hydrogenation of coke-forming bodies on the catalyst, thus preventing their buildup. The overall result of the high hydrogen pressures, and the high level of hydrogenation activity of the catalyst, is that the process requires careful control as to temperature, pressure and feed rate in order to prevent a runaway hydrogenation, resulting in a rapid temperature rise, and possibly an explosion. These difficulties, as well as the attendant expense involved in high pressure operations, are avoided in large measure by the use of the novel catalyst described herein. These catalysts display a substantial hydrocracking activity, but at the same time appear to be highly selective in that the equilibrium coke level on the catalyst is only about 1–4% by weight under most hydrocracking conditions. Typical hydrocracking catalysts of the prior art, e.g. nickel on silica-alumina, will under the same conditions build up a coke level of 10–20%. Hence, in the process of this invention, lower hydrogen pressures of e.g. about 200–3000 p.s.i.g. may be employed, resulting in substantial savings in plant construction costs, less danger of runaway hydrocracking, and longer catalyst life between regenerations.

The hydrocracking conditions employed herein involve passing the vaporized hydrocarbons over the finished catalyst at temperatures ranging between about 750° and 1100° F., pressures between about 100 and 5000 p.s.i.g., preferably between about 200 and 3000 p.s.i.g., and space velocities ranging between about 0.1 and 10.0. The preferred hydrogen ratios may range between 500 and 10,000 s.c.f. per barrel of feed.

Substantially any hydrocarbon may be used as feed, except those of a purely aromatic nature, i.e. those containing no alkyl moieties. Feedstocks of especial interest include straight-run gas oils boiling between about 400° and 800° F., cycle oils from conventional cracking operations boiling generally in the gas oil range, heavy naphtha fractions, and alkyl aromatic hydrocarbons in general. The process is especially valuable for converting pure alkyl aromatic hydrocarbons, or fractions rich therein, to lower boiling alkyl aromatic hydrocarbons, and/or to totally dealkylated aromatic hydrocarbons. In one modification of the process, a heavy bottoms fraction recovered from a naphtha reformate may be hydrocracked to produce a gasoline fraction of very high knock rating, as well as a substantial quantity of pure naphthalene. Where highly aromatic stocks are treated it is preferred to use more severe conditions of temperature, in the range of about e.g. 850° to 1100° F.; but where the feed consists mainly of paraffinic or naphthenic hydrocarbons it is preferred to use somewhat lower temperatures in the range of e.g. about 750 to 950° F.

The principal or sole component of the catalysts of this invention consists of certain crystalline, partially dehydrated metallo-alumino-silicates, now commonly referred to in the art as "molecular sieves." These materials are also zeolites in that they exhibit substantial cation exchange properties. Specifically, the zeolites operable herein are of the "X" crystal type of the approximate molecular structure (on a water-free basis):

$$[6\pm1(DO)\cdot 6(Al_2O_3)\cdot 15\pm2(SiO_2)]_y$$
$$[6\pm1(M_2O)\cdot 6(Al_2O_3)\cdot 15\pm2(SiO_2)]_{(1-y)}$$

where D is a divalent alkaline earth metal, M is alkali metal, and $y$ is a number from 0 to about 0.8.

These materials are conveniently prepared by heating stoichiometric quantities of alumina and silica with an excess of alkali metal hydroxide and water at temperatures of e.g. 60–120° C. After heating for several minutes to several hours, a crystalline zeolite is formed, which in the case of sodium hydroxide, would correspond to the formula:

$$[6\pm1(Na_2O)\cdot 6(Al_2O_3)\cdot 15\pm2(SiO_2)] \qquad (I)$$

This material, after washing and dehydration, will have a relatively uniform average pore diameter of about 13 A. This material constitutes the preferred catalyst, or catalyst base, of this invention. It has been found that the X zeolites having average pore diameters of about 11–14 A. are active hydrocracking catalysts, but those having a 10 A. pore diameter are substantially inactive. The 10 A. zeolite is prepared for example by subjecting zeolite (I) to ion exchange with a soluble calcium salt, e.g. calcium chloride, until substantially all sodium ions are replaced by calcium. Zeolites within the 11–14 A. range are prepared by exchanging 0–80% of the sodium ions with calcium ions, or other alkaline earth metal ions. Calcium is the preferred alkaline earth metal ion; where other alkaline earth metal are employed, crystals of slightly different average pore diameter are obtained, depending upon the specific metal ion. Alkaline earth metal includes specifically, beryllium, magnesium, strontium, barium, and calcium. Part or all of the sodium may also be displaced with other alkali metal ions as e.g. potassium, lithium, cesium, etc., in which case there will be a relatively small decrease in average pore diameter.

The preferred zeolite (I) of this invention is commercially available from Linde Company, Tonawanda, New York, under the trade name "Molecular Sieves 13X," and corresponds substantially to the formula:

$$[6Na_2O\cdot 6Al_2O_3\cdot 15SiO_2]$$

For further details regarding the manner of preparation of the "X" zeolites of this invention, reference is made to British Patent No. 477,233, which describes the preparation of several different types, any of which may be used herein, provided that their average pore diameter is within the range of 11–14 A.

Certain naturally occurring minerals, e.g. faujasite, chabazite, analcite, gmelinite and the like can be heated to dehydrate the crystals and obtain an activated zeolite similar to the synthetic materials above described. These activated natural zeolites may also be used herein, provided that their pore diameter falls within the range of 11–14 A.

The foregoing zeolites are preferably employed in the form of lumps, granules, or pellets ranging in size from about 1/16" to 1/2" in diameter. In forming such pellets or granules it may be desirable to employ minor proportions of binders such as hydrogenated corn oil or the like, and in case the dry zeolites are to be pelleted, a small proportion, e.g. one to two percent by weight, of graphite may be incorporated therein to act as a lubricant. The binders and lubricants, if employed, may be removed by combustion during the final drying step if desired.

If an added promoter is used, such promoter may be added to the zeolite either before or after the pelleting operation. Generally, it is preferred to impregnate the preformed pellets or granules with appropriate aqueous solutions of the desired promoters, and then calcine the impregnated material to decompose the added salt to an oxide, sulfide, or the free metal. Suitable promoters include in general the transitional metals, their oxides or sulfides, and especially the metals of groups VB, VIB, VIIB, and VIIIB, as well as their oxides and/or sulfides. Specific examples include vanadium, chromium, molybdenum, tungsten, manganese, iron, cobalt, nickel, rhodium, platinum, palladium, and the oxides and sulfides thereof. Mixtures of any two or more of such components may also be used.

For purposes of impregnation, an appropriate solution of a salt of the desired promoter is first prepared, and the powdered or pelleted zeolite is then immersed in the solution, allowed to soak for a few minutes, drained, dried and calcined at e.g. 500–1200° F. Under normal conditions of impregnation, substantially no ion exchange takes place with the lattice metals of the zeolite. Preferred metal salts for impregnation include the nitrates, acetates, formates, sulfates and the like, as well as alkaline salts such as ammonium molybdate, ammonium tungstate, ammonium chromate, and the like. When more than one promoter is employed, the appropriate salts may be simultaneously or alternately impregnated. Where alternate impregnation is employed, it is preferable to dry or calcine the catalyst between the separate impregnation steps.

The foregoing promoters are preferably employed in amounts ranging between about 0.2% and 15% by weight of the finished catalyst. For most purposes, the optimum proportion lies between about 0.5% and 6.0% by weight, based on the free metal.

During usage, the accumulation of coke or other deactivating deposits, will eventually cause an undesirable decline in activity of the catalyst. When this occurs, the catalyst may be regenerated to substantially the initial activity by controlled combustion to remove such inactivating deposits. Regeneration may be accomplished by heating at e.g. 600–1200° F. for one to twelve hours in the presence of air, or preferably air diluted with an inert gas such as flue gas.

The process of this invention may be more fully illustrated by the following examples, which are not however intended to be limiting in scope:

*Example I*

Pseudocumene was subjected to hydrodealkylation at a temperature of 1050° F., LHSV 1, pressure 1000 p.s.i.g., and using about four moles of hydrogen per mole of pseudocumene. The catalyst consisted of the above-described "molecular sieves 13X," as obtained from Linde Company. This catalyst has a substantially uniform pore diameter of 13 A., and corresponds substantially to the formula:

$$[6Na_2O\cdot 6Al_2O_3\cdot 15SiO_2]$$

Analysis of the product showed that about 20% of the feed was dealkylated, and the yield of xylenes was about 15.4% by volume, based on feed. Of the xylene fraction, 37.6% was para-xylene, which is considerably higher than the thermodynamic equilibrium proportion (about 20%). Substantially all of the unconverted pseudocumene was recovered, and little or no isomerization occurred, as evidenced by the fact that only traces of isomeric trimethylbenzenes were present, and no detectable amounts of tetramethylbenzenes.

Upon repeating the foregoing run at 950° F. the conversion was about 7%, but the xylene fraction was 40.3% para-xylene. This example shows that the unpromoted 13X molecular sieves constitute an active hydrocracking catalyst for pseudocumene at temperatures in excess of about 900° F.

Example II

Another sample of the 13X catalyst used in Example I was impregnated first with aqueous ammonium molybdate, dried, and then impregnated with aqueous cobalt nitrate. The impregnated material was then drained, dried and calcined to yield a final catalyst containing 9% $MoO_3$ and 3% CoO by weight. The finished catalyst was then employed for the hydrocracking of pseudocumene at 950 F., the other hydrocracking conditions being the same as in Example I. About 21% of the feed was converted, mainly to xylenes, and of the xylene fraction, about 36.5% was para-xylene. Only traces of benzene and toluene were formed. This example shows that the addition of a transitional metal oxide promoter raises the activity level of the catalyst at 950° F. to approximately the same level as the unpromoted catalyst exhibits at 1050° F. Again, little or no isomerization was detectable. The lack of isomerization activity is further evidenced by the high proportion of para-xylene present.

Example III

The hydrocracking activity of a "10X molecular sieve" was evaluated in another run using pseudocumene as feed. This catalyst was also obtained under the designated trade name from Linde Company, and corresponds substantially to the formula:

$$[6CaO \cdot 6Al_2O_3 \cdot 15SiO_2]$$

The pseudocumene was contacted with the catalyst at 950° F., the remaining conditions being the same as in Example I. Analysis of the product showed that extensive isomerization and transalkylation had taken place, but substantially no hydrocracking had occurred. A 16 volume-percent yield of tetramethylbenzenes was found, 9.4 volume-percent of 1,3,5-trimethylbenzene, and about 3.2% of toluene. The xylene fraction analyzed 20% para-xylene. It is thus evident that this catalyst, while active for isomerization, is substantially inactive for hydrocracking, and appears incapable of producing other than substantially an equilibrium mixture of xylenes.

Example IV

The unpromoted 13X catalyst of Example I was tested for hydrocracking of the heavy ends from a naphtha reformate. This heavy fraction was separated from the reformate obtained by subjecting a straight-run naphtha of about 450° F. end-point to reforming in the presence of an 0.2% platinum-on-alumina catalyst at a temperature of about 950° F. and 1 LHSV. More specifically, the reformate fraction used as feed herein consisted of a 3% bottoms product boiling between about 410° and 550° F. It was substantially wholly aromatic and contained initially only about 3% of naphthalene.

The conditions of hydrocracking were: temperature 1050° F., pressure 1000 p.s.i.g., LHSV 1.0, and about 4 moles of hydrogen per "mole" of feed. The volume-percent yields, based on feed, were as follows: overall liquid yield 93%, 400° end-point gasoline 35%, naphthalene 7.7%, alkylated naphthalenes suitable for recycle, 35–40%. The gasoline fraction was 80% $C_7$–$C_{10}$ aromatics, and its clear blending octane number was 108–110, which is considerably higher than the 400° F. end-point gasoline obtained from the reforming step.

Thus, the heavy ends of reformate, which are of very limited value in present day gasoline blends, are converted by this catalyst into 35% of extremely high quality gasoline suitable for blending stock, and by recycling the alkylated naphthalenes, an ultimate yield of about 40–45% of pure naphthalene is obtainable.

The foregoing experiment was repeated using the 13X zeolite upon which was impregnated 3% of cobalt oxide and 9% of molybdenum oxide. In this case the yield of 400° F. end-point gasoline was 36.5%, of which 84% was $C_6$–$C_{10}$ aromatics. A 10.1% yield of pure naphthalene was obtained, and 28.7% of alkylated naphthalenes suitable for recycle.

Example V

The unpromoted 13X catalyst of Example I was tested for hydrocracking a light cycle oil boiling between about 400° and 600° F. This cycle oil was obtained from a commercial fluid catalytic cracking operation, and contained about 21.4 volume-percent of saturates plus olefins, 20.4% of monocyclic aromatics, and 40.3% of alkyl naphthalenes. Upon hydrocracking this feed under the conditions of Example IV, there was obtained a 20% yield of gasoline, 3.5% of naphthalene, and about 40% of alkylated naphthalenes suitable for recycle. The gasoline fraction contained 71% by volume of $C_7$–$C_{10}$ aromatics.

The preceding experiment was then repeated using the 13X catalyst containing 3% of cobalt oxide and 9% of molybdenum oxide. The gasoline yield in this case was 24%, naphthalene 7%, and alkylated naphthalenes suitable for recycle about 40%. The gasoline fraction contained about 63% by volume of $C_7$–$C_{10}$ aromatics.

Analysis of the 13X cobalt oxide-molybdenum oxide catalyst used in the foregoing experiments (about 11 hours on stream) showed a low coke content of about 3.3%, which is substantially the equilibrium level. This is substantially lower than the amount formed when conventional catalysts such as nickel oxide on silica-alumina are used under the same conditions.

The foregoing examples are not to be construed as limiting in scope. Similar results are obtained when other zeolitic metallo-alumino-silicates within the 11–14 A. range are substituted for the 13X zeolites used in the foregoing examples. Other transitional metals, their oxides and/or sulfides may be substituted for the cobalt oxide-molybdenum oxide promoter of the above examples with substantially similar results. It is intended that the true scope of the invention be defined by the following claims.

I claim:

1. A method for hydrocracking hydrocarbon feedstocks to obtain lower boiling hydrocarbons, which comprises subjecting said feedstock to hydrocracking conditions in the presence of added hydrogen and a catalyst, said catalyst comprising as the essential active component a crystalline zeolitic metallo-alumino-silicate having a relatively uniform average pore diameter of between about 11 and 14 A., and corresponding substantially to the general formula:

$$[6\pm1(DO) \cdot 6(Al_2O_3) \cdot 15\pm2(SiO_2)]_y$$
$$[6\pm1(M_2O) \cdot 6(Al_2O_3) \cdot 15\pm2(SiO_2)]_{(1-y)}$$

wherein D is an alkaline earth metal, M is an alkali metal, and y is a number from 0 to about 0.8.

2. A process as defined in claim 1 wherein said feedstock is a cracked cycle oil fraction boiling between about 400° and 800° F.

3. A process as defined in claim 1 wherein said feedstock is a high boiling fraction of a naphtha reformate, said fraction boiling between about 400° and 550° F.

4. A process as defined in claim 1 wherein said feedstock is an alkyl aromatic hydrocarbon.

5. A process as defined in claim 1 wherein said catalyst comprises as the essential active component a sodium-alumino-silicate having an average pore diameter of about 13 A., and corresponding substantially to the formula:

$$[6\pm1(Na_2O) \cdot 6(Al_2O_3) \cdot 15\pm2(SiO_2)]$$

6. A process as defined in claim 1 wherein said catalyst contains an added promoter selected from the group consisting of transitional metals, their oxides and sulfides.

7. A process as defined in claim 1 wherein said hydrocracking conditions comprise a temperature between about 750° and 1100° F., pressure between about 200 and 3000 p.s.i.g., a space velocity between about 0.1 and 10, and a hydrogen ratio between about 500 and 10,000 s.c.f. per barrel of feed.

8. A method for hydrocracking a high boiling fraction of naphtha reformate, said fraction boiling between about 400° and 550° F., to obtain therefrom substantial yields of naphthalene and high-octane gasoline, which comprises subjecting said fraction to hydrocracking at a temperature between about 850° and 1100° F., and a pressure between about 200 and 3000 p.s.i.g., in the presence of a catalyst, said catalyst comprising as its essential active component a crystalline zeolitic metallo-alumino-silicate having a relatively uniform pore diameter between about 11 and 14 A., and corresponding to the general formula:

$$[6\pm1(DO)\cdot 6(Al_2O_3)\cdot 15\pm2(SiO_2)]_y$$
$$[6\pm1(M_2O)\cdot 6(Al_2O_3)\cdot 15\pm2(SiO_2)]_{(1-y)}$$

wherein D is an alkaline earth metal, M is an alkali metal, and y is a number from 0 to about 0.8, and recovering therefrom high-octane, 400° F. end-point gasoline, and naphthalene.

9. A process as defined in claim 8 wherein said catalyst comprises as its essential active component a sodium-alumino-silicate having an average pore diameter of about 13 A., and corresponding to the formula:

$$[6\pm1(Na_2O)\cdot 6(Al_2O_3)\cdot 15\pm2(SiO_2)]$$

10. A process as defined in claim 9 wherein said catalyst contains a minor proportion of an added promoter selected from the class consisting of the transitional metals, their oxides and sulfides.

11. A process as defined in claim 10 wherein said promoter is a mixture of cobalt oxide and molybdenum oxide.

12. A method for effecting demethylation of pseudocumene to obtain substantial amounts of xylenes, which comprises subjecting pseudocumene to hydrocracking at a temperature between about 850° and 1100° F. and a pressure between about 200 and 3000 p.s.i.g., in the presence of a catalyst, said catalyst comprising as its essential active component a crystalline zeolitic metallo-alumino-silicate having a relatively uniform pore diameter between about 11 and 14 A., and corresponding to the general formula:

$$[6\pm1(DO)\cdot 6(Al_2O_3)\cdot 15\pm2(SiO_2)]_y$$
$$[6\pm1(M_2O)\cdot 6(Al_2O_3)\cdot 15\pm2(SiO_2)]_{(1-y)}$$

wherein D is an alkaline earth metal, M is an alkali metal, and y is a number from 0 to about 0.8, and recovering therefrom a xylene fraction rich in para-xylene.

13. A process as defined in claim 12 wherein said catalyst comprises as its essential active component a sodium-alumino-silicate having an average pore diameter of about 13 A., and corresponding to the formula:

$$[6\pm1(Na_2O)\cdot 6(Al_2O_3)\cdot 15\pm2(SiO_2)]$$

14. A hydrocracking catalyst consisting essentially of (1) a dehydrated crystalline zeolitic metallo-alumino-silicate having a relatively uniform pore diameter between about 11 and 14 A., and corresponding to the general formula:

$$[6\pm1(DO)\cdot 6(Al_2O_3)\cdot 15\pm2(SiO_2)]_y$$
$$[6\pm1(M_2O)\cdot 6(Al_2O_3)\cdot 15\pm2(SiO_2)]_{(1-y)}$$

wherein D is an alkaline earth metal, M is an alkali metal, and y is a number from 0 to about 0.8, and (2) a minor proportion of an added promoter selected from the class consisting of the transitional metals of groups VB, VIB, VIIB, and VIIIB, their oxides and sulfides.

15. A catalyst as defined in claim 14 wherein said metallo-alumino-silicate is a sodium-alumino-silicate corresponding to the general formula:

$$[6\pm1(Na_2O)\cdot 6(Al_2O_3)\cdot 15\pm2(SiO_2)]$$

16. A catalyst as defined in claim 15 wherein said promoter is cobalt oxide plus molybdenum oxide.

References Cited in the file of this patent

UNITED STATES PATENTS

| | | |
|---|---|---|
| 2,270,044 | Fulton et al. | Jan. 13, 1942 |
| 2,382,951 | Ahlberg et al. | Aug. 21, 1945 |
| 2,464,205 | Bates | Mar. 15, 1949 |
| 2,799,626 | Johnson et al. | July 16, 1957 |
| 2,834,429 | Kinsella et al. | May 13, 1958 |
| 2,849,383 | Hirschler et al. | Aug. 26, 1958 |
| 2,886,512 | Winyall | May 12, 1959 |
| 2,909,582 | Bleich et al. | Oct. 20, 1959 |